US006367864B2

(12) United States Patent
Rogers, Jr. et al.

(10) Patent No.: US 6,367,864 B2
(45) Date of Patent: Apr. 9, 2002

(54) VEHICLE HAVING POWER OPERATED LIFTGATE

(75) Inventors: Lloyd Walker Rogers, Jr., Shelby Township; David A. Sedlak, Clarkston; Michael Antonio Ciavaglia, Dearborn; Ronald James Wilde, St. Clair Shores; Theodore J Lindsay, Shelby Township, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/780,158

(22) Filed: Feb. 9, 2001

Related U.S. Application Data

(60) Provisional application No. 60/198,062, filed on Apr. 18, 2000.

(51) Int. Cl.[7] .................................................. B60J 1/08

(52) U.S. Cl. ................. 296/146.4; 296/56; 296/146.11; 296/57.1; 49/340

(58) Field of Search ................................ 296/146.4, 56, 296/146.8, 57.1; 49/324, 344, 40, 340, 347, 280, 139; 74/424

(56) References Cited

U.S. PATENT DOCUMENTS

| | | | | |
|---|---|---|---|---|
| 1,954,739 A | | 4/1934 | Lyons | |
| 3,022,108 A | | 2/1962 | Cooley | |
| 3,217,366 A | | 11/1965 | Wenger | |
| 3,713,472 A | | 1/1973 | Dozois | |
| 3,747,271 A | | 7/1973 | Adamski | |
| 4,903,435 A | | 2/1990 | Bittmann et al. | |
| 5,449,212 A | * | 9/1995 | Seifert | 296/57.1 |
| 5,466,036 A | * | 11/1995 | Stroeters et al. | 296/146.11 |
| 5,531,498 A | * | 7/1996 | Kowall | 296/146.4 |
| 5,563,483 A | * | 10/1996 | Kowall et al. | 49/280 |
| 5,588,258 A | * | 12/1996 | Wright et al. | 49/340 |
| 5,896,703 A | * | 4/1999 | Wright et al. | 49/340 |
| 5,920,159 A | * | 7/1999 | Miller et al. | 49/352 |
| 5,982,126 A | * | 11/1999 | Hellinga et al. | 49/28 |
| 6,018,912 A | * | 2/2000 | Baughman et al. | 296/146.4 |
| 6,055,775 A | * | 5/2000 | Dering et al. | 49/340 |
| 6,055,776 A | * | 5/2000 | Detting et al. | 296/56 |
| 6,068,327 A | * | 5/2000 | Junginger | 296/56 |
| 6,092,336 A | * | 7/2000 | Wright et al. | 49/340 |
| 6,092,337 A | * | 7/2000 | Johnson et al. | 49/340 |
| 6,126,222 A | * | 10/2000 | Nguyen et al. | 296/56 |
| 6,142,551 A | * | 11/2000 | Ciavaglia et al. | 296/56 |
| 6,145,917 A | * | 11/2000 | Ishii et al. | 296/146.4 |
| 6,202,350 B1 | * | 3/2001 | Montgomery et al. | 49/341 |
| 6,220,649 B1 | * | 4/2001 | Rife | 296/146.8 |
| 6,298,604 B1 | * | 10/2001 | Rogers, Jr. et al. | 49/340 |

* cited by examiner

*Primary Examiner*—Ken Patel
(74) *Attorney, Agent, or Firm*—Patrick M. Griffin

(57) ABSTRACT

A vehicle has a power operated liftgate and at least one power unit comprising a fixed linear guide channel and a follower that moves in the guide channel. The follower is universally connected to a rod having at one end and the opposite end of the rod is universally connected to the vehicle lift gate. A flexible drive loop which is attached to the follower wraps part way around two pulleys at opposite ends of the guide channel. The flexible drive loop is driven by a bi-directional drive unit that includes a reversible electric motor, an electromagnetic clutch and a drive wheel that engages the flexible drive loop. The flexible drive loop may be a drive cable, a drive tape, or a drive chain or a combination of cable, tape and/or chain.

10 Claims, 2 Drawing Sheets

VEHICLE HAVING POWER OPERATED LIFTGATE

This application claims the benefit of U.S. provisional application No. 60/198062 filed on Apr. 18, 2000, the disclosures of which are incorporated herein by reference in their entirety as if set forth at length.

TECHNICAL FIELD

This invention relates to a vehicle having a power operated liftgate that is pivotally attached to a vehicle roof for pivotal movement about a generally horizontal hinge axis and more particularly to a vehicle having a power operated liftgate that is moved from a fully closed position to a fully open position and from an open position to a fully closed position.

BACKGROUND OF THE INVENTION

Sport utility vehicles, vans and the like that are equipped with liftgates that are hinged at the top about a generally horizontal hinge axis are used by large numbers of people today. Some of these liftgates are large and heavy. Their size and weight make some liftgates difficult to open and close. Some of the liftgates are also a great distance above the ground when they are fully opened. Their height above the ground makes them very difficult for some people to close. For these and other reasons many people would like to have a power operating system for opening and closing the liftgate.

U.S. Pat. No. 4,903,435 granted to Werner Bittmann et al Feb. 27, 1990 discloses a device for motorized opening and closing of pivotal body panels of motor vehicles comprising an actuation rod that is pivotally attached to the pivotal body panel at one end and to a slide block at the opposite end. The slide block is moved in an inclined linear track by a control cable that is moved in a closed loop by a cable drum driven by an electric motor. The Bittmann '435 device is bulky and cumbersome and relies on gravity to fully close the pivotal body panel.

U.S. Pat. No. 5,588,258 granted to Kevin Wright et al Dec. 31, 1996 discloses a power operator for a pivotal closure element comprising two gas charged struts and an extendible strut adapted for extension by a cable drive. This power operation opens and closes the pivotal closure element fully. However, the extendible strut and cable drive are complicated and expensive and require substantial vertical space.

U.S. Pat. No. 6,055,775 granted to Timothy Dering et al May 2, 2000 discloses a liftgate self-closing device comprising a pneumatic actuator that is pivotally attached to liftgate at one end and to a tape at the opposite end. The tape is a generally elongated belt member having a rack formed on an underside. The rack is disposed in a track and driven by a pinion gear attached to the output shaft of an electric motor. Alternatively, tape could be an endless member. In either event, the liftgate is opened manually until an over center condition is achieved in the pneumatic actuator which then opens the liftgate automatically. The liftgate is closed by energizing the motor to drive the tape and pneumatic actuator downwardly until the liftgate is closed by gravity. The Dering device requires manual operation to open the liftgate and relies on gravity to fully close the liftgate.

U.S. Pat. No. 6,092,337 granted to Joseph Michael Johnson et at Jul. 25, 2000 discloses a vehicle liftgate power operating system having two drive units in which a segmented sector rides in a track with an end sector that is attached to the liftgate. The segmented sector is driven by a pinion gear attached to the output shaft of an electric motor. This power operating system opens and closes the liftgate fully and is satisfactory for its intended purpose. However, the drive units reduce the head room in the cargo space which may be objectionable to some users.

SUMMARY OF THE INVENTION

The object of the invention is to provide an improved vehicle liftgate power operating system.

A feature of the invention is that the vehicle liftgate power operating system has one or two power units that can move the liftgate from a closed position to a fully opened position as well as from an open position to a fully closed position.

Another feature of the invention is that the liftgate power operating system has one or two power units that attach to the D-pillars and thus do not diminish head room in the cargo area.

Another feature of the invention is that the power operating system has one or two power units that attach to the D-pillars while requiring very little vertical space thus being particularly well suited for after market sales and a retrofit installation.

Still another feature of the invention is that the liftgate power operating system has one or two power units that are compact, durable and economical to manufacture.

Yet another feature of the invention is that the liftgate power operating system has one or two power units that are vertically oriented and associated with the D-pillar to minimize intrusion into the cargo area of the vehicle and into the unobstructed load width at the liftgate opening, particularly at the lower end.

These and other objects, features and advantages of the invention will become more apparent from the following description of a preferred embodiment taken in conjunction with the accompanying drawing.

BRIEF DESCRIPTION OF THE DRAWINGS

The presently preferred embodiment of the invention is disclosed in the following description and in the accompanying drawings, wherein.

DETAILED DESCRIPTION OF A PREFERRED EMBODIMENT

Figure 1:
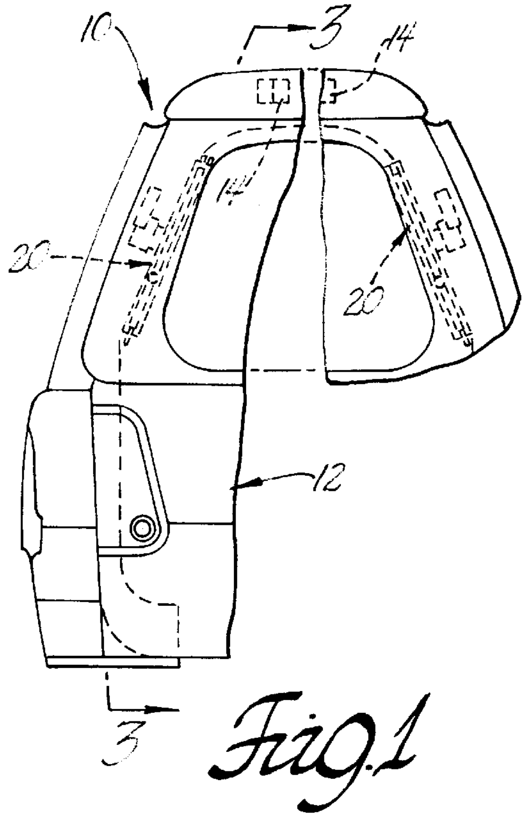
FIG. 1 is a fragmentary rear view of a vehicle equipped with a power operated liftgate in accordance with the invention.

Referring now to the drawings, vehicle 10 has a liftgate 12 that is attached to the aft end of the vehicle roof by two hinge assemblies 14. Hinge assemblies 14 have hinge portions that are secured to a roof channel of the vehicle 10 and hinge portions that are secured to liftgate 12 so that liftgate 12 pivots about a substantially horizontal hinge axis 16 between a closed position shown in FIGS. 1 and 3 and an open position shown in FIGS. 2 and 4. Liftgate 12 is generally permitted to pivot about 90° about the substantially horizontal hinge axis 18 16. However, the range of movement can be varied substantially from one model of vehicle to another.

Liftgate 12 is opened and closed manually or by a suitable power operating system comprising two identical power units 20 that are installed in the aft end of the vehicle body at the respective vertical body pillars 22, commonly referred to as the D pillars, that define the width of the rear opening that is closed by liftgate 12. The typical power unit 20 is shown in greater detail in FIG. 4.

Each power unit 20 comprises a fixed rectangular guide channel 24 that is fixed to a body portion of the vehicle by a bracket, fastener, weldment of the like (not shown) at or near the D pillar 22 in a vertical orientation. The rectangular guide channel 24 has an elongated vertical slot 26 in a rearward facing wall 28 of the guide channel 24 that faces toward tailgate 12 when tailgate 12 is in the closed position.

A follower 30 is disposed in the guide channel 24 and moves vertically in the guide channel. Follower 30 has a universal connector in the form of a ball stud 32 that projects through slot 26. A rod 34 has a mating universal connector in the form of a socket 36 at one end that receives the ball stud 32 so that rod 34 is universally connected to follower 30. Rod 30 has a socket 38 at an opposite end that is universally connected to a mating ball stud 40 attached to a side wall of the vehicle lift gate 12. It should be understood that any type of universal connector can be used between rod 34 and follower 30 at one end of rod 34 and between rod 34 and liftgate 12 at the other end of rod 34 and that the positions of the ball studs and the sockets of the ball joints 32, 36 and 38, 40 of illustrated example can be reversed.

Power unit 20 further comprises a first pulley 42 at a lower end of the guide channel 24 and a second pulley 44 at an upper end of the guide channel. A flexible drive loop in the form of a drive chain 46 extends into the upper and lower open ends of guide channel 24. The opposite ends of drive chain 46 are attached to the opposite ends of follower 30 so that drive chain 46 is in effect, endless. Pulleys 42 and 44 (which are preferably idler sprockets when a drive chain is used) are aligned with rectangular guide channel 24 so that drive chain 46 wraps part way around lower pulley 42 and part way around upper pulley 44 before extending into the opposite open ends of guide channel 24.

Power unit 20 further comprises a bi-directional drive unit 48 having a drive wheel in the form of a drive sprocket 50 that drivingly engages an exterior portion of drive chain 46 outside of guide channel 24. Drive sprocket 50 drives drive chain 46 in one direction to move liftgate 12 to the open position and in an opposite direction to move liftgate 12 to the closed position Drive unit is preferably located so that drive sprocket is equidistant from pulleys 42 and 44 as shown in FIG. 4.

Bi-directional drive unit 48 includes a reversible electric motor 49 and preferably an electromagnetic clutch 52. Electromagnetic clutch is driven by reversible electric motor 49 via a suitable gear set and drive sprocket 50 is driven by electromagnetic clutch 52 through a second suitable gear set.

Figure 2:
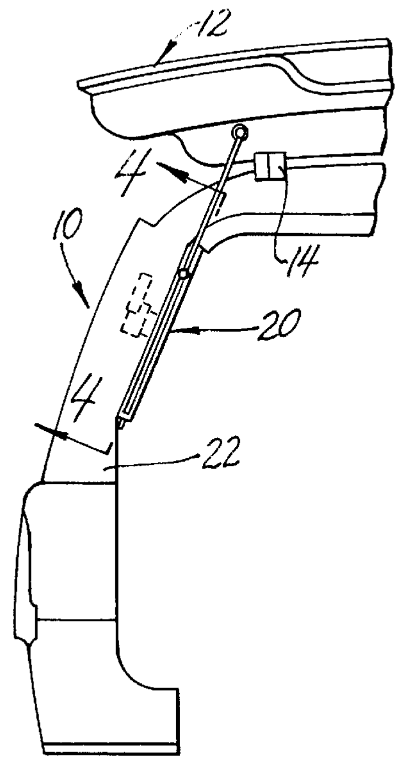
FIG. 2 is a fragmentary rear view of the vehicle of FIG. 1 showing the power operated liftgate in the open position.
Figure 3:
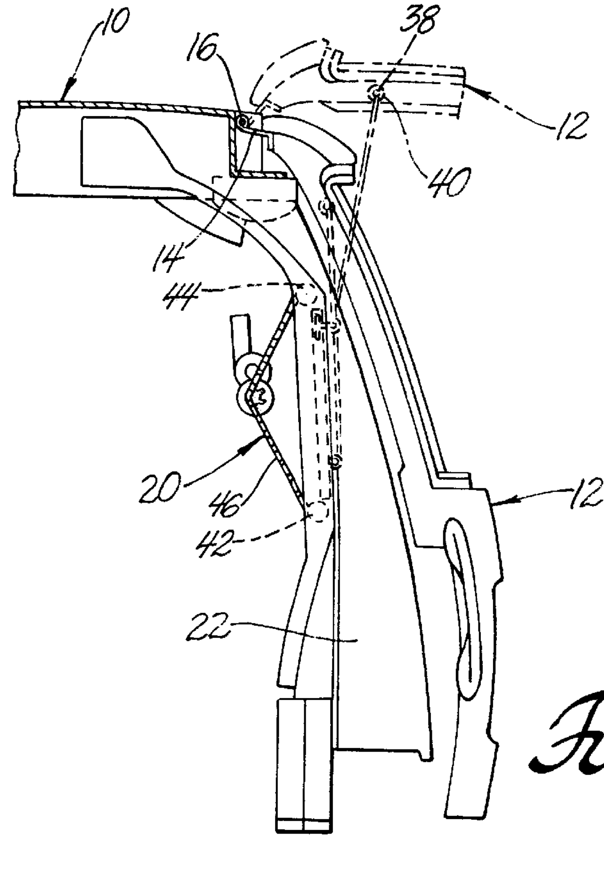
FIG. 3 is a section view of the vehicle taken substantially along the line 3—3 of FIG. 1 looking in the direction of the arrows.

The operation of the power operating system is as follows. When liftgate 12 is in the open position as shown in FIG. 2, in phantom in FIG. 3 and in FIG. 4, follower 30 is at or near the top of the elongated slot 26 in guide channel 24 as best shown in FIG. 4. To close liftgate 12 motor 49 and electromagnetic clutch 52 are energized to rotate drive sprocket 50 counterclockwise as viewed in FIG. 4. This moves drive chain 46 counterclockwise in the loop defined by pulleys 42, 44 and drive sprocket 50 and pulls follower 30 down in guide channel 24. As follower 30 is pulled down, liftgate 12 is moved toward the closed position by rod 34. Follower 30 is pulled down in guide channel 24 until liftgate is closed at which time follower 30 is positioned at or near the bottom of elongated slot 26 in guide channel 24 as shown in FIGS. 1 and 3 and in phantom in FIG. 4. When liftgate is closed, a limit switch or the like is actuated to deenergize motor 49 and electromagnetic clutch 52.

Figure 4:
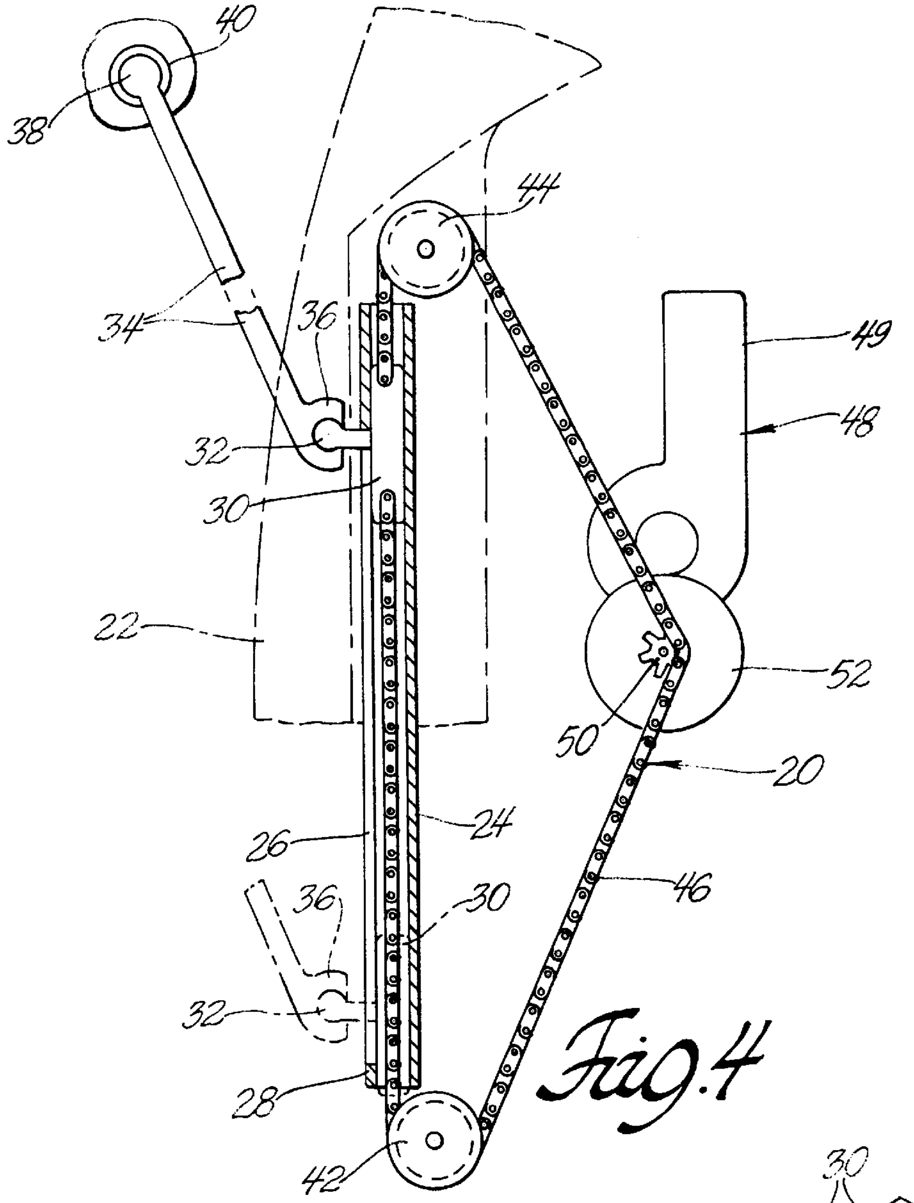
FIG. 4 is a section view of the vehicle taken substantially along the line 4—4 of FIG. 2 looking in the direction of the arrows.

The closed liftgate 12 shown in FIGS. 1 and 3 is opened by energizing motor 49 and electromagnetic clutch 52 to rotate drive sprocket 50 clockwise as viewed in FIG. 4. This moves drive chain 46 clockwise in its loop and pulls follower 24 up in guide channel 24. As follower 30 is pulled up, liftgate 12 is moved toward the open position by rod 34. Follower 30 is pulled up in guide channel 24 until liftgate is opened at which time follower 30 is positioned at or near the top of elongated slot 26 in guide channel 24 as shown in FIGS. 2 and 4. When liftgate 12 is opened, a limit switch or the like is actuated to deenergize motor 49 and electromagnetic clutch 52.

The electromagnetic clutch 52 is deenergized after the liftgate 12 is opened or closed to facilitate manual opening and closing of the liftgate 12 in the event of power failure. However, the electromagnetic clutch can be eliminated so long as the bi-directional electric motor 49 can be back driven by manual movement of the tailgate in the event of a power failure.

Figure 5:
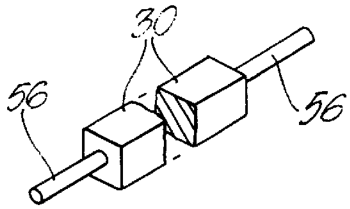
FIG. 5 is a fragmentary perspective view of an alternate drive loop for the power operated liftgate shown in FIGS. 1–4.
Figure 6:
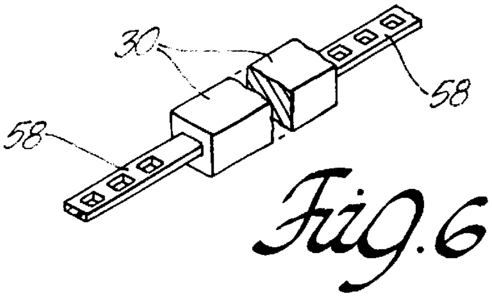
FIG. 6 is a fragmentary perspective view of another alternate drive loop for the power operated liftgate shown in FIGS. 1–4.

While the flexible drive loop is illustrated as being a drive chain 46, any flexible drive member can be used, such as a drive cable 56 or a slotted drive tape 58 that are shown in FIGS. 5 and 6 respectively. In such instances, pulleys 42 and 44 would be modified to cooperate with the drive cable 56 or slotted drive tape 58. In other words, while the present invention has been described as carried out in a specific embodiment thereof, it is not intended to be limited thereby but is intended to cover the invention broadly within the scope and spirit of the appended claims.

What is claimed is:

1. A vehicle having a power operated liftgate that is pivotally attached to an aft end of a vehicle roof for pivotal movement about a hinge axis between a generally horizontal open position and a closed generally vertical position comprising:

a fixed linear guide channel, a follower that moves in the guide channel, the follower having a universal connector, a rod having a mating universal connector at one end that is universally connected to the universal connector of the follower, the rod having a second universal connector at an opposite end that is universally connected to the vehicle liftgate, a first pulley at one end of the guide channel, a second pulley at an opposite end of the guide channel, a flexible drive loop attached to the follower, the flexible drive loop wrapping around part of the first pulley and part of the second pulley, and a bi-directional drive unit engaging the flexible drive loop for driving the flexible drive loop in one direction to move the lift gate to the open position and in an opposite direction to move the lift gate to the closed position.

2. The vehicle as defined in claim 1 wherein the flexible drive loop is a drive cable.

3. The vehicle as defined in claim 1 wherein the flexible drive loop is a drive tape.

4. The vehicle as defined in claim 1 wherein the flexible drive loop is a drive chain and the first pulley and the second pulley are sprockets.

5. The vehicle as defined in claim 1 wherein the bi-directional drive unit includes a reversible electric motor, an electromagnetic clutch driven by the reversible electric motor, and a drive wheel driven by the electromagnetic clutch that drivingly engages the flexible drive loop.

6. A vehicle having a power operated liftgate that is pivotally attached to an aft end of a vehicle roof for pivotal movement about a hinge axis between an open position and a closed position about a hinge axis and at least one drive unit, comprising:

a fixed linear guide channel that is attached to a vertical pillar of the vehicle, the fixed linear guide channel having an elongated vertical slot, a follower that is disposed in the guide channel and that moves in the guide channel, the follower having a universal connector that projects through the slot, a rod having a mating universal connector at one end that is universally connected to the universal connector of the follower, the rod having a second universal connector at an opposite end that is universally connected to a mating universal connector of the vehicle lift gate, a first pulley at one end of the guide channel, a second pulley at an opposite end of the guide channel, a flexible drive loop attached to the follower in an endless manner, the flexible drive loop wrapping around part of the first pulley and part of the second pulley, and a bi-directional drive unit having a drive wheel that drivingly engages the flexible drive loop for driving the flexible drive loop in one direction to move the lift gate to the open position and in an opposite direction to move the lift gate to the closed position.

7. The vehicle as defined in claim 6 wherein the bi-directional drive unit includes a reversible electric motor and an electromagnetic clutch driven by the reversible electric motor, and the drive wheel being driven by the electromagnetic clutch.

8. The vehicle as defined in claim 7 wherein the flexible drive loop is a drive cable.

9. The vehicle as defined in claim 7 wherein the flexible drive loop is a drive tape.

10. The vehicle as defined in claim 7 wherein the flexible drive loop is a drive chain, and the first pulley, the second pulley and the drive wheel are sprockets.

* * * * *